(12) United States Patent
Sashihara

(10) Patent No.: US 6,434,405 B1
(45) Date of Patent: Aug. 13, 2002

(54) TRANSMITTING AND RECEIVING CARD SELECTIVELY ATTACHED TO PORTABLE PHONE OR INFORMATION TERMINAL

(75) Inventor: Toshiyuki Sashihara, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/362,949

(22) Filed: Jul. 28, 1999

(30) Foreign Application Priority Data

Jul. 29, 1998 (JP) .......................................... 10-214645

(51) Int. Cl.⁷ ................................................ H04B 1/38
(52) U.S. Cl. ........................ 455/557; 455/558; 455/912
(58) Field of Search ................................. 455/557, 558, 455/550, 556, 466, 414, 403, 412, 425, 575, 186.1

(56) References Cited

U.S. PATENT DOCUMENTS

| | | | | |
|---|---|---|---|---|
| 5,475,757 A | * | 12/1995 | Kelly .......................... 380/24 |
| 5,814,798 A | * | 9/1998 | Zancho ........................ 235/380 |
| 5,845,204 A | * | 12/1998 | Chapman et al. ........... 455/343 |
| 5,920,826 A | * | 7/1999 | Metso et al. ................. 455/557 |
| 5,948,066 A | * | 9/1999 | Whalen et al. .............. 709/229 |
| 5,956,651 A | * | 9/1999 | Willkie et al. .............. 455/553 |
| 5,978,655 A | * | 11/1999 | Ohura et al. ................. 455/41 |
| 6,067,529 A | * | 5/2000 | Ray et al. ..................... 705/26 |
| 6,105,060 A | * | 8/2000 | Rothblatt ..................... 709/219 |
| 6,105,873 A | * | 8/2000 | Jeger .......................... 235/487 |
| 6,115,617 A | * | 9/2000 | Ib .............................. 455/564 |
| 6,138,009 A | * | 10/2000 | Birgerson .................... 455/419 |
| 6,104,028 A | * | 11/2000 | Waugh ........................ 455/445 |
| 6,151,507 A | * | 11/2000 | Laiho et al. ................. 455/466 |
| 6,157,954 A | * | 12/2000 | Moon et al. ................. 709/228 |
| 6,169,897 B1 | * | 1/2001 | Kariya ........................ 455/426 |
| 6,181,691 B1 | * | 1/2001 | Markgraf et al. ........... 370/352 |
| 6,181,707 B1 | * | 1/2001 | Erickson et al. ............ 370/442 |
| 6,198,752 B1 | * | 6/2001 | Lee ............................. 370/474 |

FOREIGN PATENT DOCUMENTS

| | | |
|---|---|---|
| JP | 2-127856 | 5/1990 |
| JP | 8-97852 | 4/1996 |

* cited by examiner

Primary Examiner—William Trost
Assistant Examiner—Congvan Tran
(74) Attorney, Agent, or Firm—Dickstein, Shapiro, Morin & Oshinsky, LLP

(57) ABSTRACT

A transmitting and receiving card selectively attached to a portable phone or an information terminal is provided, by which operations for transmitting and receiving data to and from the information terminal as a server can be automatically performed without connecting the portable phone and the information terminal via a cable and without monitoring the radio signal quality by the user. When the card is attached to the portable phone, the card selects a period during which the radio wave has a good condition and acts as the information terminal so as to retrieve information such as e-mail stored in a server via the portable phone, and to transmit information stored in advance in the card to such a server according to a request. When the card is attached to the information terminal, the card acts as a server so as to transmit and receive the information to and from the information terminal.

6 Claims, 11 Drawing Sheets

TRANSMITTING AND RECEIVING CARD SELECTIVELY ATTACHED TO PORTABLE PHONE OR INFORMATION TERMINAL

BACKGROUND OF THE INVENTION

1. Field of the Invention

The present invention relates to a transmitting and receiving card used for transmitting or receiving information data, by using a portable phone, between a portable information terminal such as an e-mail (i.e., electronic mail) terminal and a (mail) server.

This application is based on Patent Application No. Hei 10-214645 filed in Japan, the contents of which are incorporated herein by reference.

2. Description of the Related Art

When e-mail is transmitted and received using a portable information terminal or the like in a conventional method, the user must continuously monitor the radio signal quality, which is a burden on the user. In order to solve this problem, the portable information terminal itself may monitor the radio signal quality so that the mail transmitting and receiving operations can be performed when the radio signal is better or stronger. Generally, when e-mail is transmitted and received using a portable information terminal or the like, a device integrally consisting of a portable phone and a portable information terminal, such as a cellular phone or a personal handyphone system (called a PHS, hereinbelow), is used, or a separate portable phone and portable information terminal are connected to each other using a cable or the like.

However, when a portable phone and a portable information terminal are connected to each other as described above so as to transmit and receive e-mail, the advantage of the portable phone, that it is easy to carry, is lost.

SUMMARY OF THE INVENTION

In order to solve the above problem, an objective of the present invention is to provide a transmitting and receiving card, selectively attached to a portable phone or an information terminal such as an e-mail server, by which operations for transmitting and receiving e-mail or the like to and from a (mail) server can be automatically performed without connecting the portable phone and the information terminal via a cable and without monitoring the radio signal quality by the user.

Therefore, the present invention provides a transmitting and receiving card selectively attached to a portable phone or an e-mail terminal, wherein:

when the card is attached to the portable phone,
the card monitors the radio signal quality and acts as an agent for the e-mail terminal so as to receive e-mail addressed to the current user, stored in a mail server, via the portable phone and to transmit e-mail, stored in the card in advance, to the mail server according to a request while the monitored radio signal quality is good, and when the card is attached to the e-mail terminal,
the card functions as a mail server so as to transmit and receive e-mail to and from the e-mail terminal.

The above transmitting and receiving card may comprise:

a memory for storing e-mail data and setting information relating to the e-mail data;

mail receiving means for retrieving the setting information, necessary for receiving the e-mail, stored in the memory, and requesting the mail server to transmit the e-mail addressed to the user, and for storing e-mail transmitted from the mail server in the memory;

mail transmitting means for retrieving, if the memory stores e-mail to be transmitted, said e-mail and setting information necessary for transmitting the e-mail, stored in the memory, and transmitting the retrieved data to the mail server;

memory reading reception means for receiving a data retrieval request, from the portable phone or the e-mail terminal to the memory, and information on the target data;

memory writing reception means for receiving a data storing request, from the portable phone or the e-mail terminal to the memory, and data to be stored, and storing the data in the memory;

mail receiving reception means for transmitting e-mail stored in the memory to the e-mail terminal when receiving a request from the e-mail terminal for receiving the e-mail from the mail server; and mail transmitting reception means for storing e-mail transmitted from the e-mail terminal in the memory when receiving a request from the e-mail terminal for transmitting the e-mail to the mail server.

The present invention also provides a transmitting and receiving card selectively attached to a portable phone or a Web browser terminal, wherein:

when the card is attached to the portable phone,
the card obtains a Web document having the uniform resource locator format, designated by the current user, from a hyper text transfer protocol server, and when the card is attached to the Web browser terminal,
the card transmits the obtained Web document to the Web browser terminal so that the user can see the document.

The above transmitting and receiving card may comprise:

hyper text transfer protocol transmitting means for obtaining the Web document having the uniform resource locator format, designated by the user, when the card is attached to the portable phone; and hyper text transfer protocol reception means for obtaining a hyper text transfer protocol request when the card is attached to the Web browser terminal, and transmitting data corresponding to the request to the Web browser terminal.

The present invention also provides a transmitting and receiving card selectively attached to a portable phone or a database search terminal, wherein:

when the card is attached to the portable phone,
the card transmits a search request input by the current user to a database server designated by the user, and obtains a search result returning from the database server, and when the card is attached to the database search terminal,
the card acts as the database server so as to transmit a search result to the database search terminal, as a response to a search request transmitted from the database search terminal to the database server.

The above transmitting and receiving card may comprise:

database search means, operated when the card is attached to the portable phone, for transmitting a search request input by the current user to a database server designated by the user, and obtaining a search result returning from the database server; and search result providing means, acting as the database server when the card is attached to the database search terminal, for transmitting a search result to the database search terminal, as a response to a search request transmitted from the database search terminal to the database server.

Accordingly, the transmitting and receiving card of the present invention is selectively attached to the portable phone and an information terminal such as an e-mail terminal, a Web browser terminal, or a database terminal. When the card is attached to the portable phone, the card selects a period during which the radio wave has a good condition and acts as the information terminal so as to (i) retrieve information such as e-mail addressed to the current user, a Web document, or search data, stored in a mail server, hyper text transfer protocol server, or database server, via the portable phone, and (ii) transmit information stored in advance in the card to such a server according to a request. When the card is attached to the information terminal, the card acts as a server so as to transmit and receive the above-explained information to and from the information terminal.

Therefore, the conventional arrangement in which the information terminal and the portable phone are connected via a cable is unnecessary, and automatic information transmission and reception to and from the server can be performed while the radio signal quality is good. In addition, the convenience of portability can also be obtained.

DESCRIPTION OF THE PREFERRED EMBODIMENTS

Hereinafter, embodiments of the present invention will be explained with reference to the drawings.

Figure 1:
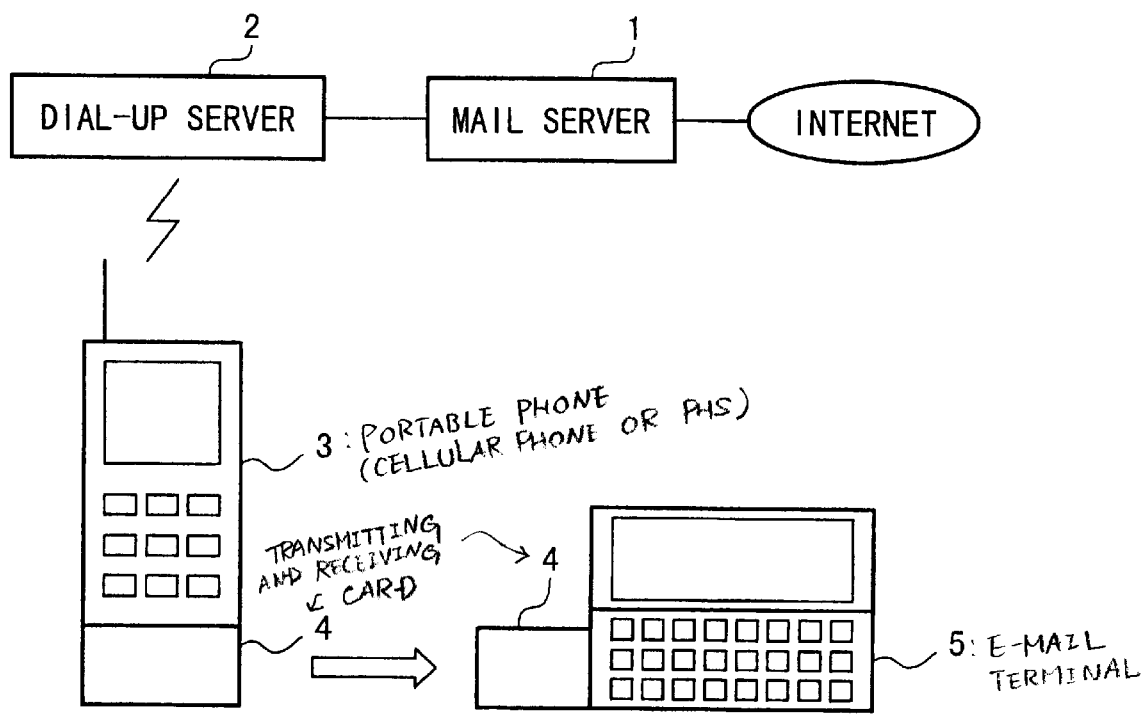
FIG. 1 is a block diagram showing an e-mail system employing a transmitting and receiving card according to the present invention.

FIG. 1 is a block diagram showing an e-mail system employing a transmitting and receiving card according to the present invention. In the figure, reference numeral 1 indicates a mail server connected to the Internet, reference numeral 2 indicates a dial-up server for connecting portable phone 3 such as a cellular phone or a PHS with the mail server 1, reference numeral 5 indicates an e-mail terminal functioning as a portable information terminal, and reference numeral 4 indicates a transmitting and receiving card which is selectively attached to portable phone 3 or e-mail terminal 5 for transmitting or receiving e-mail.

Here, this transmitting and receiving card 4 is small enough to allow the necessary portability to portable phone 3 when the card is attached thereto.

When this transmitting and receiving card 4 is attached to the portable phone 3, the transmitting and receiving card 4 detects a period when the radio wave has a good condition, and accesses mail server 1 as an agent of e-mail terminal 5 during this period so as to retrieve e-mail addressed to the user, stored in the mail server 1, via dial-up server 2 and portable phone 3. Similarly, e-mail stored in the transmitting and receiving card 4 can also be transmitted.

When the transmitting and receiving card 4 is attached to the e-mail terminal 5, the transmitting and receiving card 4 acts as if the card were mail server 1. Therefore, the e-mail terminal 5 can transmit or receive e-mail in the same way as observed when the terminal 5 is directly connected to the mail server 1. Accordingly, e-mail transmitting and receiving operations can be performed with no consideration of the radio signal quality.

Figure 2:
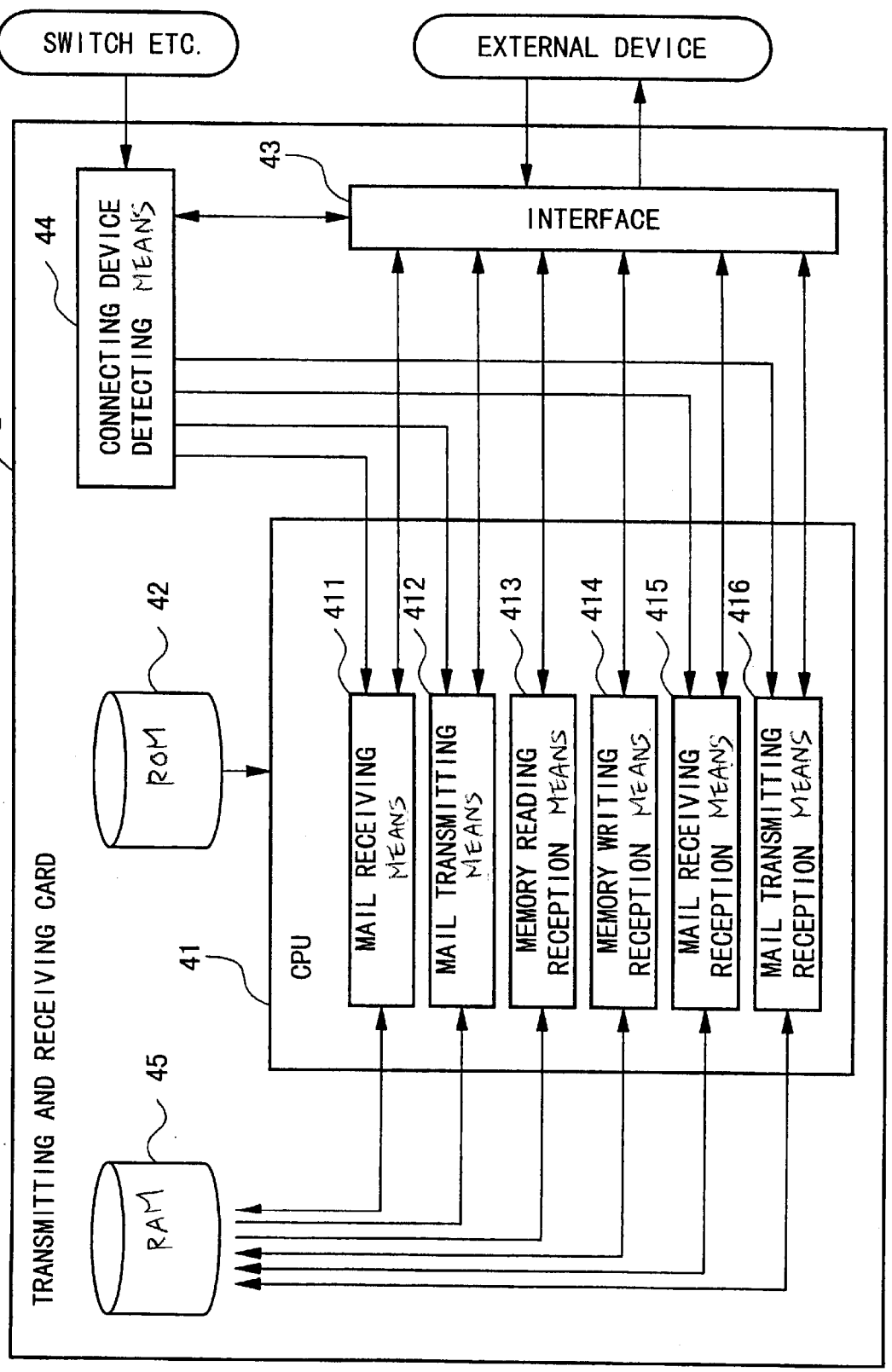
FIG. 2 is a block diagram showing the structure of the transmitting and receiving card of FIG. 1.

As shown in FIG. 2, the above transmitting and receiving card 4 comprises CPU 41, ROM 42, interface 43, connecting device detecting section 44, and RAM. Programs stored in ROM 42 and RAM 45 are executed via CPU 41 so that operations of mail receiving section 411, mail transmitting section 412, memory reading reception section 413, memory writing reception section 414, mail receiving reception section 415, and mail transmitting reception section 416 can be performed.

The mail receiving section 411 is operable when the card is attached to the portable phone 3, and this section 411 retrieves setting information, necessary for receiving e-mail, from RAM 45, and requests the mail server 1 to transmit e-mail addressed to the user via interface 43. When the mail receiving section 411 receives e-mail from the mail server 1, the section 411 stores it in RAM 45.

The mail transmitting section 412 is also operable when the card is attached to the portable phone 3. If e-mail to be transmitted is stored in RAM 45, the transmitting section 412 retrieves setting information necessary for transmitting e-mail and the e-mail itself from RAM 45, and transmits the e-mail to mail server 1 via interface 43.

When any connecting device such as portable phone 3 or e-mail terminal 5 issues a request for retrieving some contents stored in RAM 45, the memory reading reception section 413 transmits the contents to the relevant connecting device via interface 43.

On the other hand, when the memory writing reception section 414 receives a request for storing data into RAM 45 from any connecting device via interface 43, the section 414 stores the data, which has been received together with the request, in RAM 45.

The mail receiving reception section 415 is operable when the transmitting and receiving card 4 is attached to e-mail terminal 5. When the mail receiving reception section 415 receives a request, transmitted from e-mail terminal 5 via interface 43, for receiving e-mail from mail server 1, this section 415 transmits the relevant e-mail stored in RAM 45 to the e-mail terminal 5.

The mail transmitting reception section 416 is also operable when the card 4 is attached to e-mail terminal 5. When the mail transmitting reception section 416 receives a request, transmitted from e-mail terminal 5 via interface 43, for transmitting e-mail to mail server 1, this section 416 stores e-mail, transmitted from e-mail terminal 5, in RAM 45.

In ROM 42, programs of processes (relating to each section) to be executed by CPU 41 are stored.

Interface 43 is provided for enabling communication between the transmitting and receiving card 4 and portable phone 3 or e-mail terminal 5. The data to be communicated are the radio signal quality, information on the connecting device, the contents of e-mail, and the contents of RAM 45. The portable phone 3 and the e-mail terminal 5 respectively have similar interfaces so as to communicate with the card via the interface 43.

The connecting device detecting section 44 detects the device currently connected to the transmitting and receiving card 4, with reference to information from a physical switch, interface 43, or the like.

In RAM 45, received or/and transmitted e-mail, various setting information data necessary for transmission and reception, substitutes for the programs stored in ROM 42, and the like are stored. Here, it is necessary to provide a measure for preventing the data stored in RAM 45 from being undesirably deleted, for example, using a flash memory (a nonvolatile memory), or a continuous supply of electricity.

Figure 3:
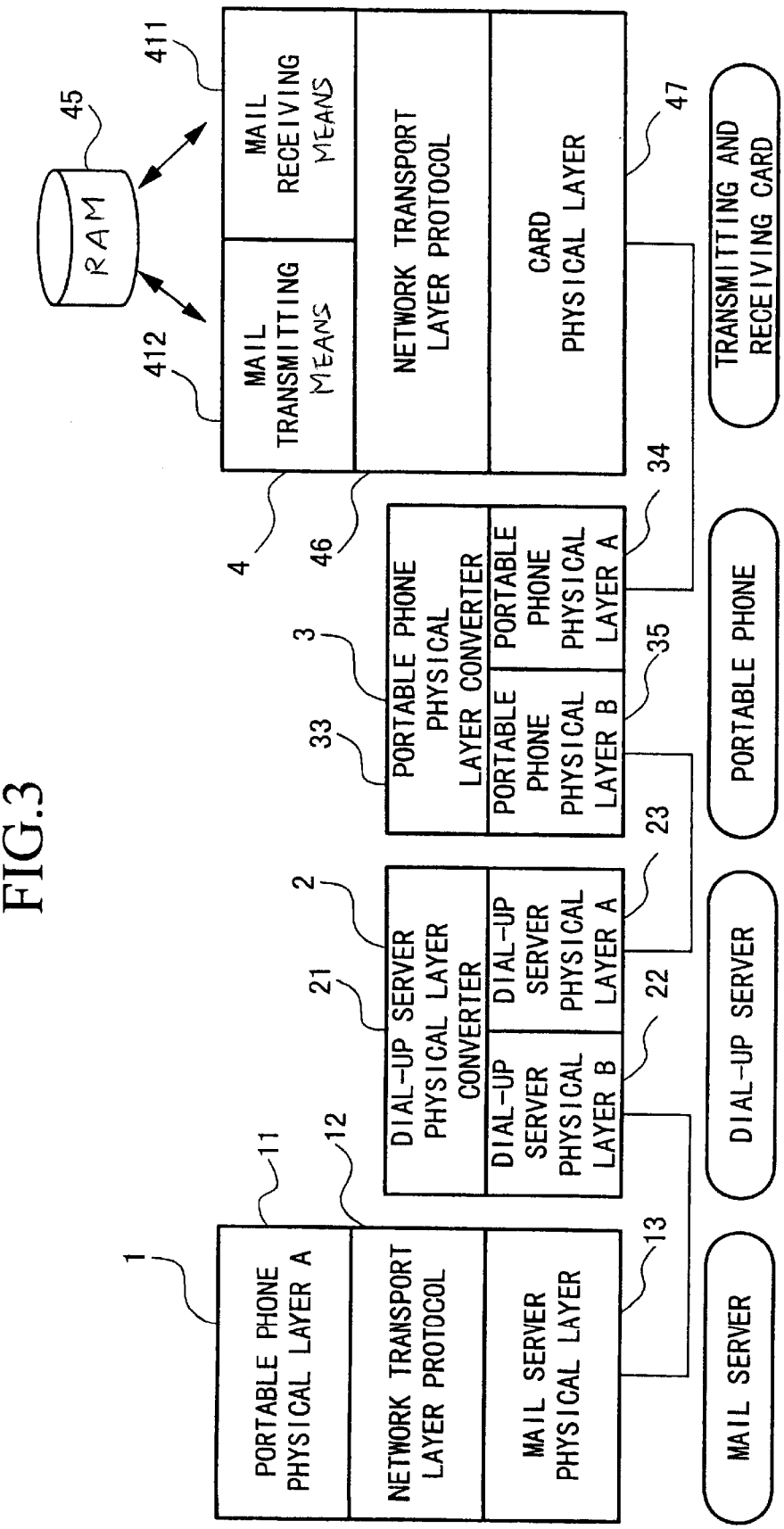
FIG. 3 is a diagram showing the protocol hierarchy when the transmitting and receiving card of FIG. 1 is attached and connected to a portable phone.

Hereinbelow, the operations will be explained in detail. FIG. 3 is a diagram showing the protocol hierarchy when the transmitting and receiving card 4 is attached and connected to the portable phone 3. Here, network transport layer protocol 12 at the mail server side and network transport layer protocol 46 at the transmitting and receiving card 4 may be a transmission control protocol/internet protocol (called "TCP/IP", hereinafter), that is, a protocol of a network layer or a transport layer. The portable phone physical layer (A) 34 and card physical layer 47 may be RS232C or the like. Dial-up server physical layer (A) 23 and portable phone physical layer (B) 35 correspond to wireless communication.

The dial-up server physical layer (B) 22 and mail server physical layer 13 may be an Ethernet. Dial-up server physical layer converter 21 performs conversion between the two physical layers positioned below, and portable phone physical layer converter 33 also performs conversion between the two physical layers positioned below.

In the above hierarchical structure, the transmitting and receiving card 4 acts as an agent for e-mail terminal 5. In this case, the mail receiving section 411 and mail transmitting section 412 are operated while the mail receiving reception section 415 and mail transmitting reception section 416 are not operated.

To explain in further detail, when the mail receiving section 411 of the transmitting and receiving card 4 receives an explicit request, issued via interface 43 by the user's command, for receiving e-mail, or when the radio wave transmitted from portable phone 3 via interface 43 has a good condition and the current time corresponds to a specified timing designated by the user, the mail receiving section 411 requests the portable phone 3 to access the dial-up server 2 and to connect thereto. When the connection has been completed, the mail receiving section 411 checks whether e-mail for the user is stored in the mail server 1, setting information for which is stored in RAM in advance. If e-mail for the user exists, the e-mail is received by the mail receiving section 411 from the mail server 1 via interface 43, and the receiving section 411 stores the mail in RAM 45. Simultaneously, the mail transmitting section 412 determines whether e-mail to be transmitted is stored in RAM 45. If e-mail to be transmitted is found, then the mail is transmitted by the transmitting section 412 to mail server 1 via interface 43.

Figure 4:
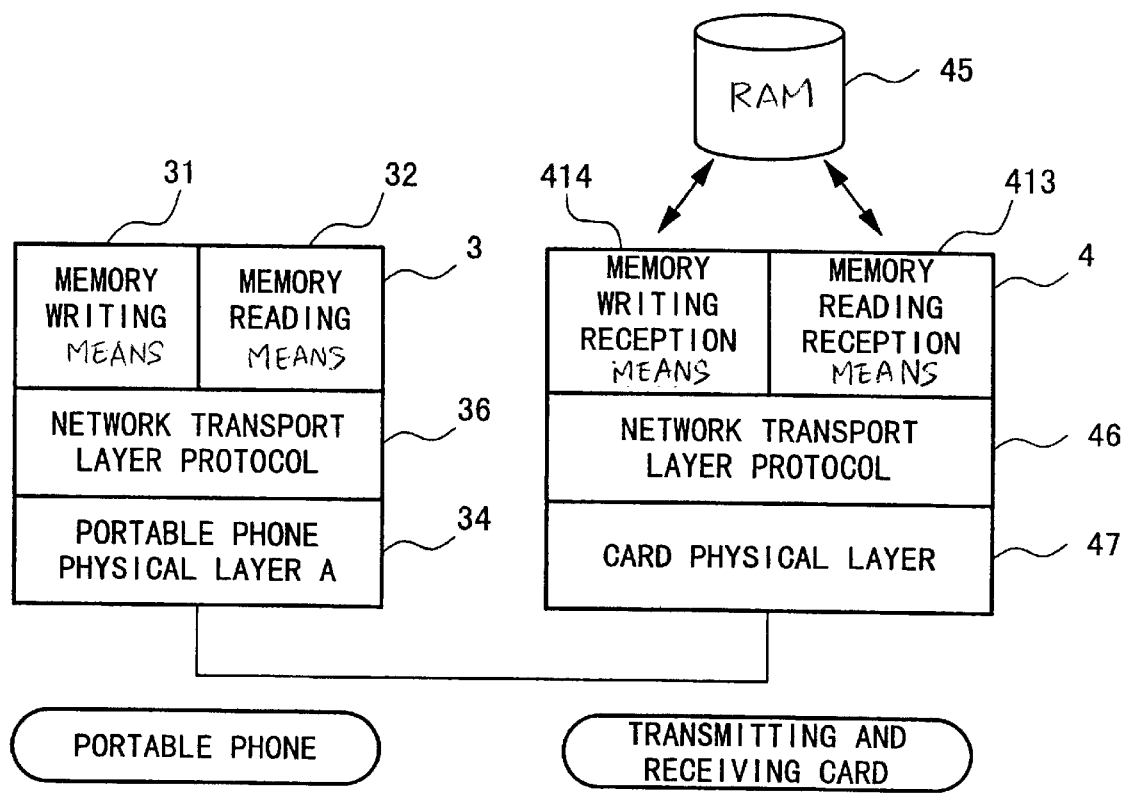
FIG. 4 is a diagram showing the protocol hierarchy when e-mail retrieved by and stored in the transmitting and receiving card of FIG. 1 is retrieved by the portable phone, or when the portable phone transmits e-mail to the card so as to store the e-mail in the card.

FIG. 4 is a diagram showing the protocol hierarchy when e-mail retrieved by and stored in the transmitting and receiving card 4 is retrieved by portable phone 3, or when the portable phone 3 transmits e-mail to the card 4 so as to store the e-mail in the card. In this figure, network transport layer protocol 36 at the portable phone 3 side and network transport layer protocol 46 at the transmitting and receiving card 4 may be TCP/IP. When the portable phone 3 refers to the contents of RAM 45, memory reading section 32 in the portable phone 3 informs the memory reading reception section 413 (at the transmitting and receiving card 4 side) of a request for retrieving data and a target memory area. Accordingly, the memory reading reception section 413 in the transmitting and receiving card 4 retrieves the contents in the designated target area in RAM 45, and informs the memory reading section 32 of the retrieved contents via interface 43. In this way, it is possible to transmit e-mail stored in RAM 45 to the portable phone 3. If a display device for displaying the contents of e-mail is provided in the portable phone 3, the e-mail retrieved by using portable phone 3 and stored in the transmitting and receiving card 4 can be shown to the user.

On the other hand, when portable phone 3 writes and stores data in RAM 45, the memory writing section 31 in the portable phone 3 informs the memory writing reception section 414 (in the transmitting and receiving card 4) of the contents to be stored and a target memory area. Accordingly, the memory writing reception section 414 of the transmitting and receiving card 4 stores the contents into the designated target area in RAM 45. In this way, if an e-mail input device is provided in the portable phone 3, e-mail input using the input device can be transmitted to and stored in RAM 45. In this case, the portable phone 3 can independently transmit e-mail.

Figure 5:
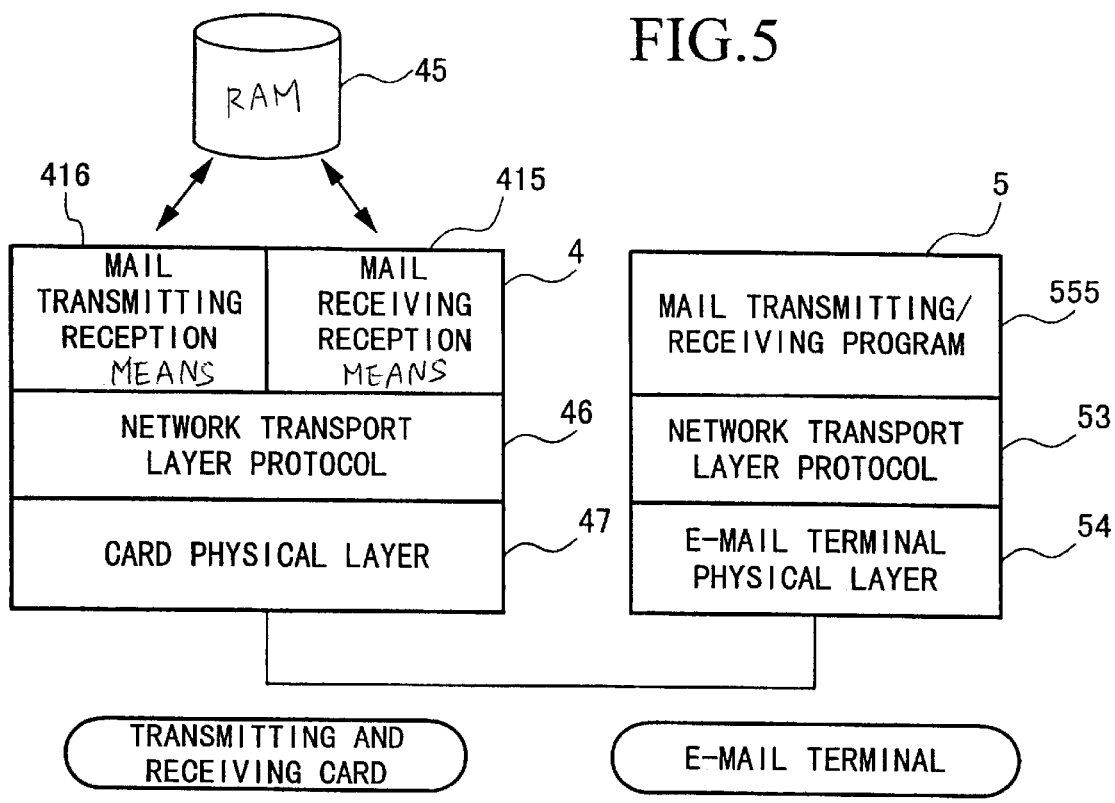
FIG. 5 is a diagram showing the protocol hierarchy when the transmitting and receiving card of FIG. 1 is attached and connected to an e-mail terminal.

FIG. 5 is a diagram showing the protocol hierarchy when the transmitting and receiving card 4 is attached and connected to the e-mail terminal 5. In this figure, network transport layer protocol 46 at the transmitting and receiving card 4 side and network transport layer protocol 53 at the e-mail terminal 5 side may be TCP/IP. Card physical layer 47 and e-mail terminal physical layer 54 may be RS 232C. In this case, the transmitting and receiving card 4 acts as an agent for mail server 1. In this case, the mail receiving reception section 415 and mail transmitting reception section 416 are operated while the mail receiving section 411 and mail transmitting section 412 are not operated.

To explain in further detail, the mail receiving reception section 415 of transmitting and receiving card 4 is operated based on the setting information stored in RAM 45. When the mail receiving reception section 415 receives a request to the mail server, issued from the e-mail terminal 5, for receiving e-mail, the section 415 transmits e-mail stored in RAM 45 to the e-mail terminal 5 via interface 43, in a way similar to that used in the transmission by the mail server.

The mail transmitting reception section 416 is also operated based on the setting information stored in RAM 45.

When the mail transmitting reception section 416 receives a request from the e-mail terminal to the mail server, for transmitting e-mail, the mail transmitting reception section 416 receives the e-mail and stores it in RAM 45 as e-mail data to be transmitted.

Figure 6:
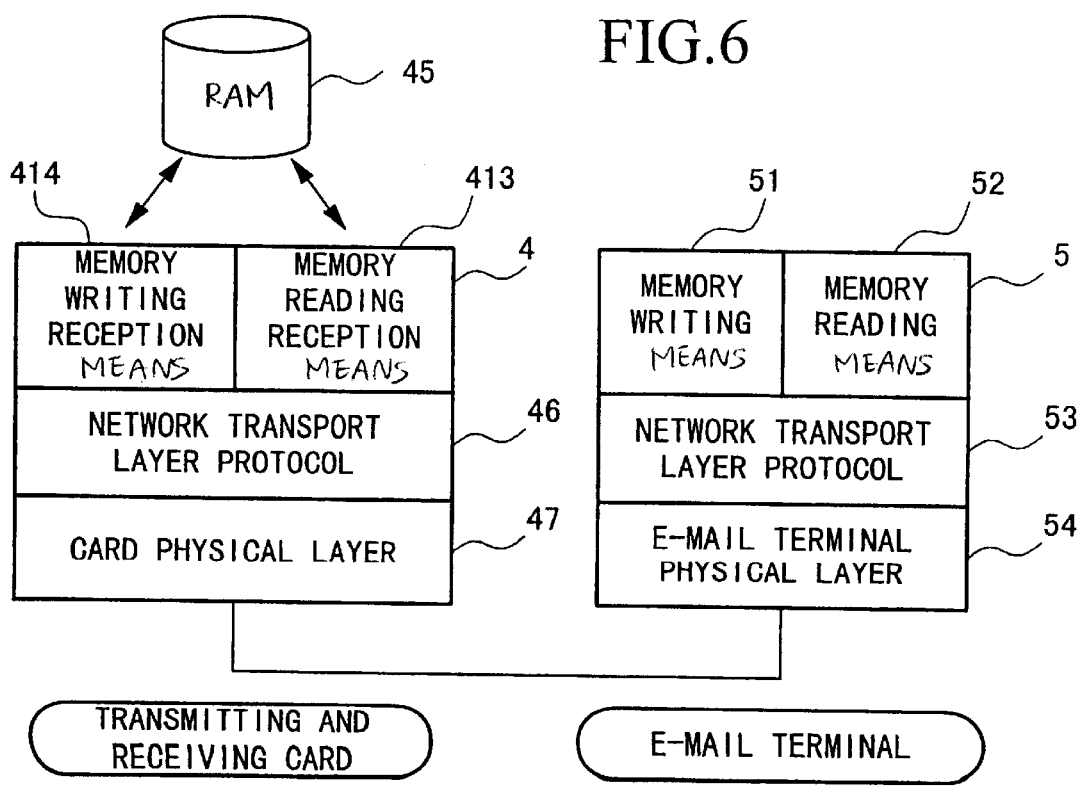
FIG. 6 is a diagram showing the protocol hierarchy when the e-mail terminal retrieves data in the transmitting and receiving card of FIG. 1 or the terminal stores data in the card.

FIG. 6 is a diagram showing the protocol hierarchy when the e-mail terminal 5 retrieves the contents in RAM 45 of the transmitting and receiving card 4 or the terminal 5 stores data into RAM 45. Preferably, memory writing section 51 and memory reading section 52 are originally included in the e-mail terminal 5. When the e-mail terminal 5 refers to the contents of RAM 45, the memory reading section 52 transmits a memory-reading request and a target memory area to the memory reading reception section 413. The memory reading reception section 413 retrieves data from the designated target area in RAM 45, and transmits the retrieved data to the memory reading section 52 via interface 43.

On the other hand, when the e-mail terminal 5 writes and stores data in RAM 45, the memory writing section 51 informs the memory writing reception section 414 of the contents to be stored and a target memory area. The memory writing reception section 414 then stores the received data in the designated target area in RAM 45. In the above-explained reading and writing operations, it is possible to read and write various setting information data, stored in RAM 45 of the transmitting and receiving card 4, by using the e-mail terminal 5 via the e-mail terminal, and to transfer and store the agent programs (stored in the ROM) into RAM 45.

As explained above, the e-mail transmitting and receiving operations can be performed in the present arrangement that the e-mail terminal and the portable phone 3 are not connected to each other. When the transmitting and receiving card 4, comprising a means for transmitting and receiving e-mail and a memory for storing the e-mail, is attached to the portable phone 3, the card acts as an agent for the e-mail terminal 5 and transmits and receives the e-mail, while when such a card is attached to the e-mail terminal 5, the card acts as an agent for the mail server 1. In the present system, it is unnecessary for the portable phone side (i.e., the user side) to always monitor or consider the radio signal quality. This is because the transmitting and receiving card 4 attached to the portable phone 3 monitors the radio signal quality and performs the transmitting/receiving operation of the e-mail while the radio signal quality is good.

Figure 7:
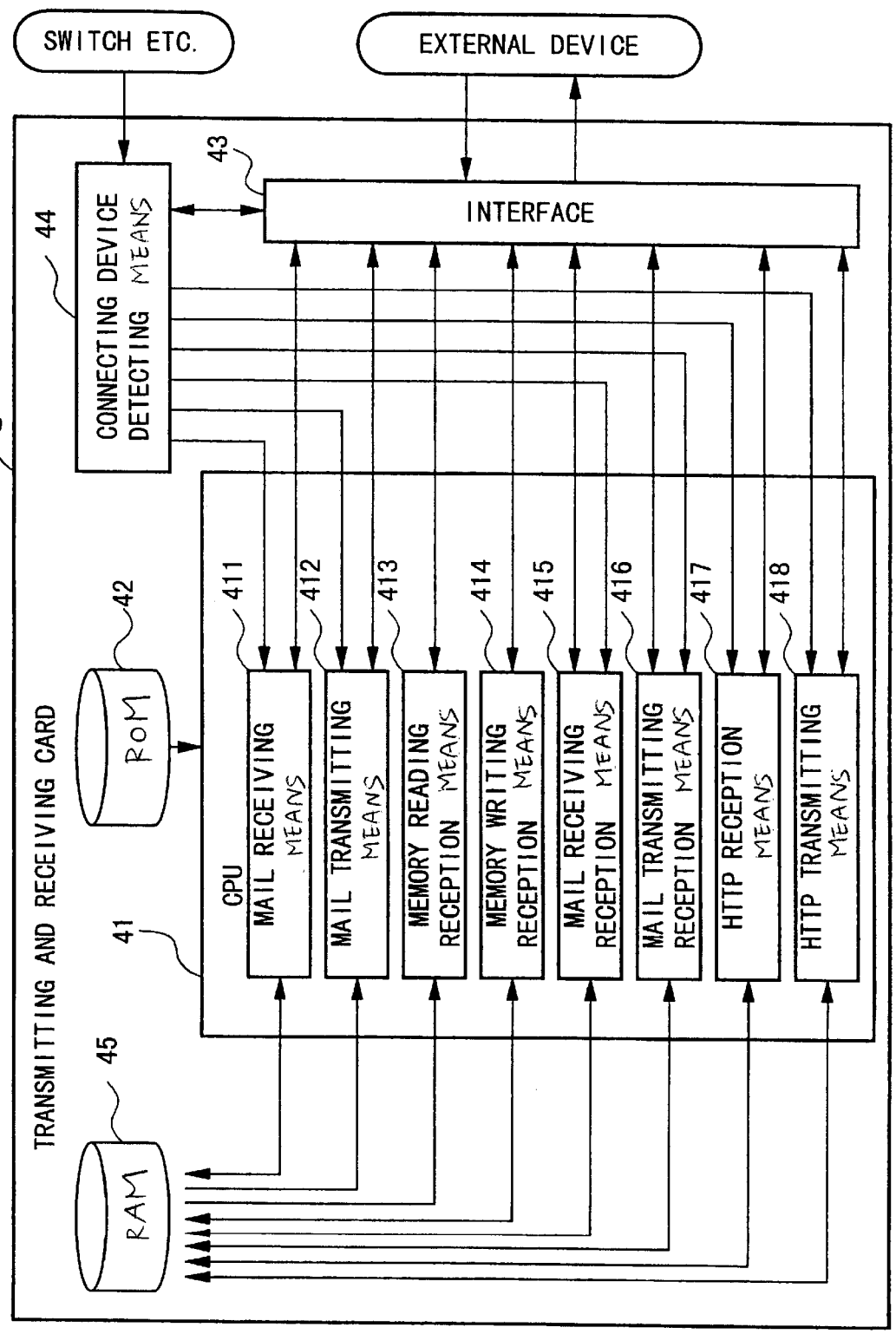
FIG. 7 is a block diagram showing a variation of the transmitting and receiving card of FIG. 1.

FIG. 7 shows another arrangement of the transmitting and receiving card 4, where HTTP (hyper text transfer protocol) reception section 417 and HTTP transmitting section 418 are further added.

The HTTP reception section 417 is operated when the transmitting and receiving card 4 is attached to a Web browser terminal. This section 417 interprets a HTTP request transmitted via interface 43, and if data required by the request exists in RAM 45, the section 417 extracts the data from RAM 45. The extracted data is transmitted to the Web browser terminal.

The HTTP transmitting section 418 is operated when the transmitting and receiving card 4 is attached to the portable phone 3. This section 418 is obtains a URL (uniform resource locator) document designated by the user, and stores it in RAM 45.

The operations performed in this arrangement will be explained in detail.

Figure 8:
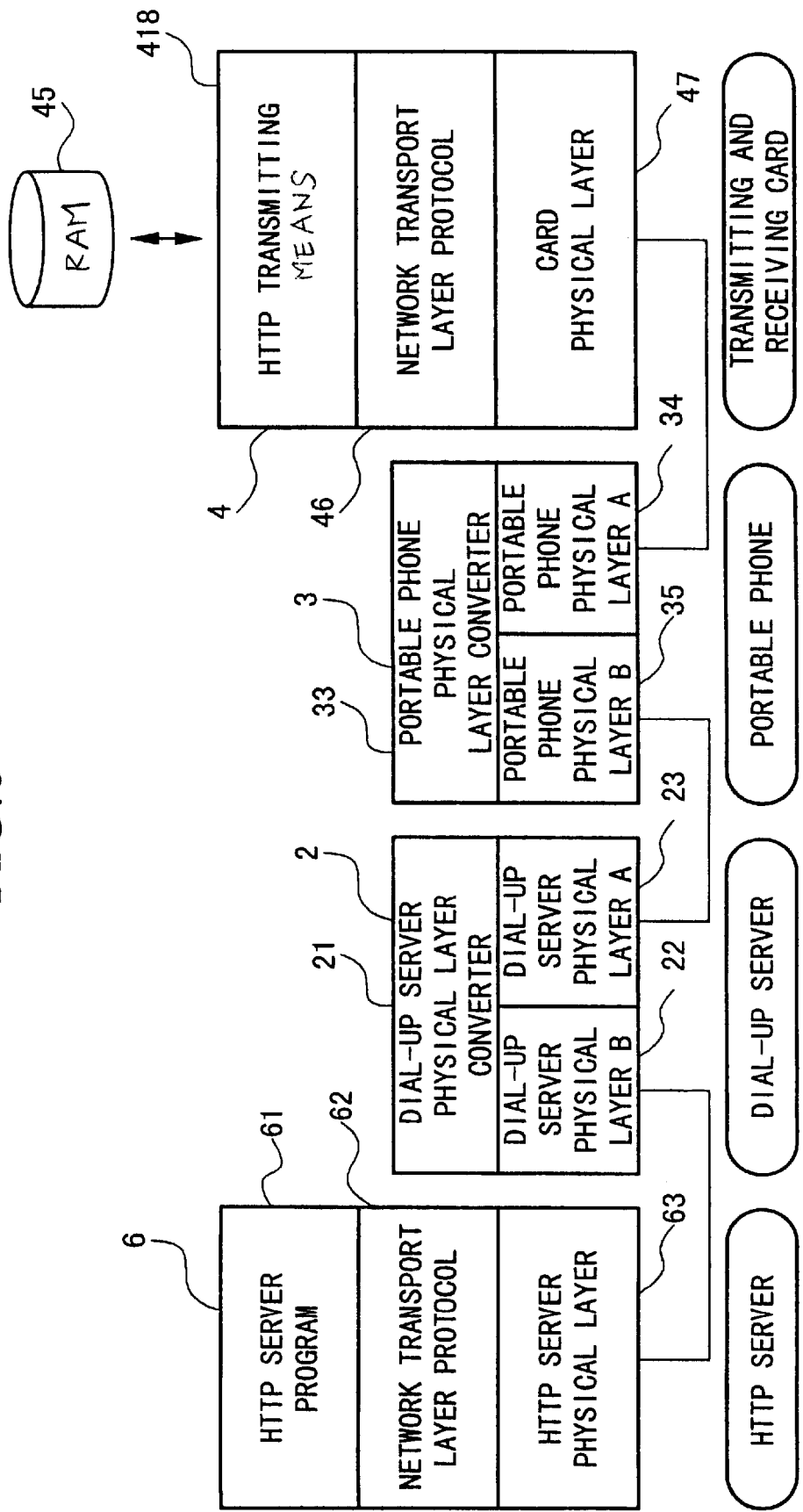
FIG. 8 is a diagram showing the protocol hierarchy when the transmitting and receiving card of FIG. 7 is attached and connected to a portable phone.

FIG. 8 is a diagram showing the protocol hierarchy when the transmitting and receiving card 4 is attached and connected to the portable phone 3. Here, network transport layer protocol 62 of the HTTP server 6 may be TCP/IP, and HTTP server physical layer 63 may be an Ethernet.

In the above structure, (i) when the user explicitly indicates that a URL document, designated in advance by the user, is retrieved, or (ii) when the radio wave has a good condition and the current time meets the requirement designated by the user, the HTTP transmitting section 418 requests the portable phone 3 to connect to the dial-up server 2. When the connection is completed, the HTTP transmitting section 418 transmits a request for obtaining the URL document, designated by the user, to HTTP server program (performing section) 61 by using the setting information stored in RAM 45. When the HTTP transmitting section 418 obtains the relevant Web document from the HTTP server program 61, the section 418 stores the document in RAM 45.

Figure 9:
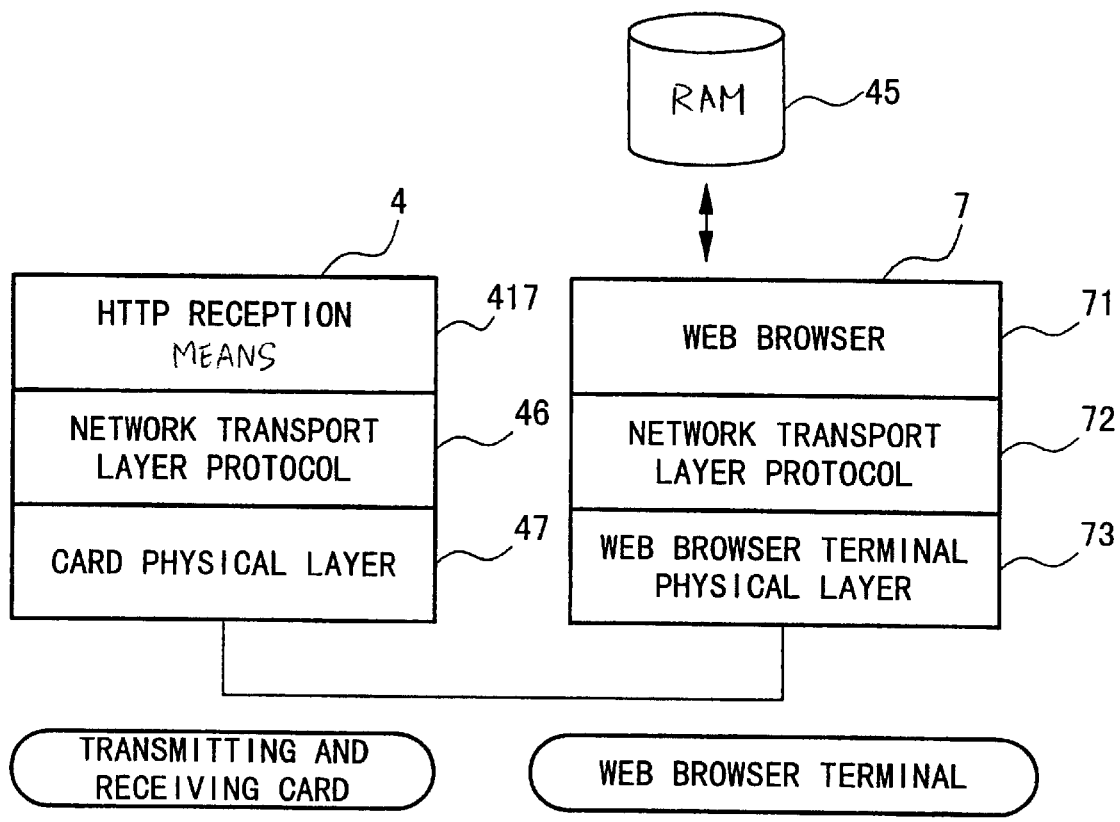
FIG. 9 is a diagram showing the protocol hierarchy when the transmitting and receiving card of FIG. 7 is attached and connected to a Web browser terminal.

FIG. 9 is a diagram showing the protocol hierarchy when the transmitting and receiving card 4 is attached and connected to Web browser terminal 7. Here, network transport layer protocol 46 at the transmitting and receiving card 4 and network transport layer protocol 72 at the Web browser terminal 7 side may be TCP/IP. Additionally, Web browser terminal physical layer 73 may be RS 232C.

In the above structure, when the HTTP reception section 417 receives a request from Web browser 71 to a server via interface 43, if any contents which meet this request are stored in RAM 45, the section 417 transmits the contents as a response to Web browser terminal 7.

In this way, in order to read a Web document, if the transmitting and receiving card 4 is attached to the portable phone 3, the card 4 automatically obtains the Web document requested by the user, so that it is unnecessary for the user to consider the radio signal quality. This is because when the transmitting and receiving card 4 is attached to the portable phone 3, the HTTP transmitting section 418 monitors the radio signal quality and obtains the URL Web document designated by the user while the condition is good.

When the transmitting and receiving card 4 is attached to the Web browser terminal 7, it is possible to read a Web document stored in the card as if the Web browser terminal 7 were connected to the portable phone 3. This is because when the transmitting and receiving card 4 is attached to the Web browser terminal 7, the HTTP reception section 417 acts as the HTTP server.

Figure 10:
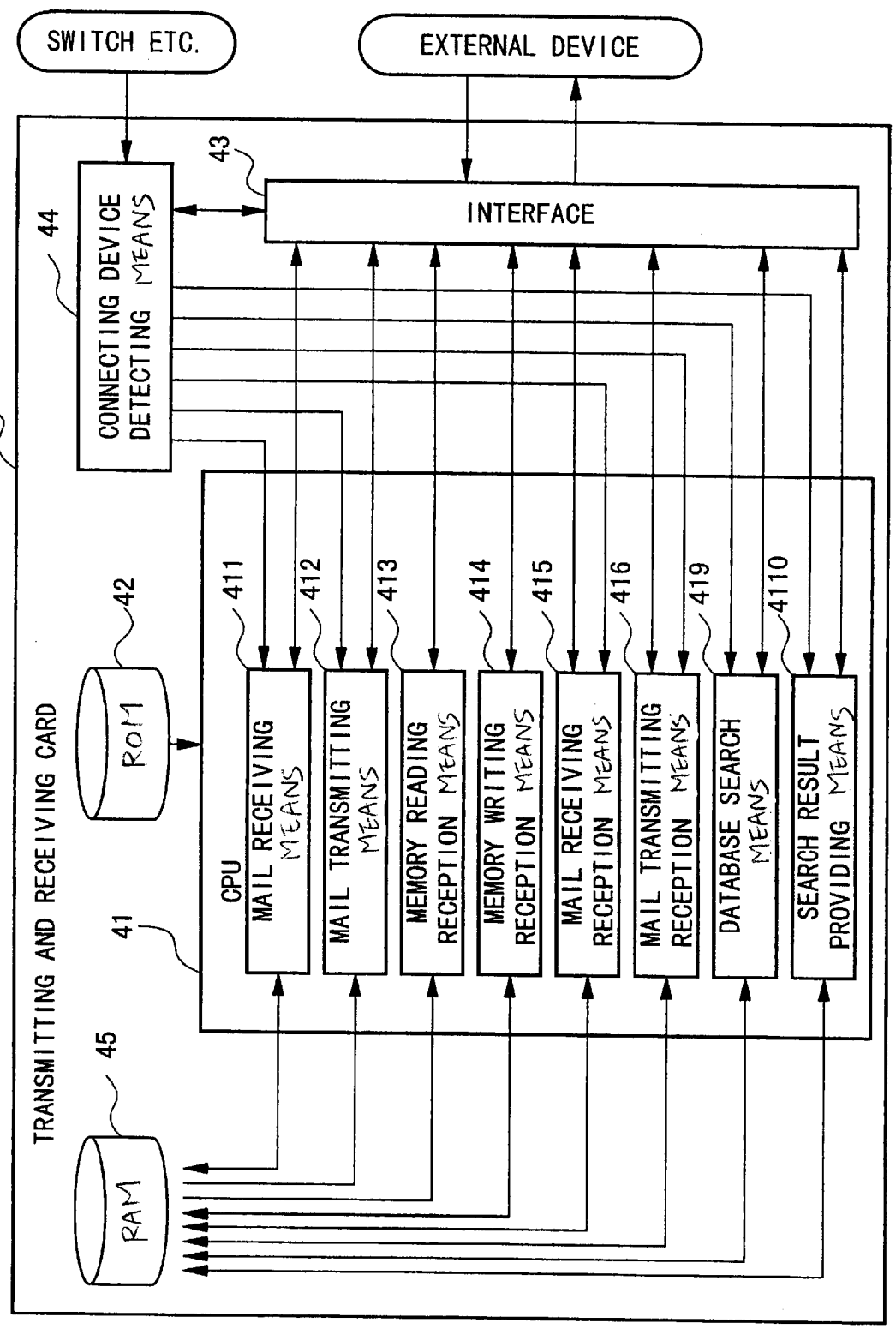
FIG. 10 is a block diagram showing another variation of the transmitting and receiving card of FIG. 1.

FIG. 10 shows another arrangement of the transmitting and receiving card 4, where database search section 419 and search result providing section 4110 are further added.

Figure 11:
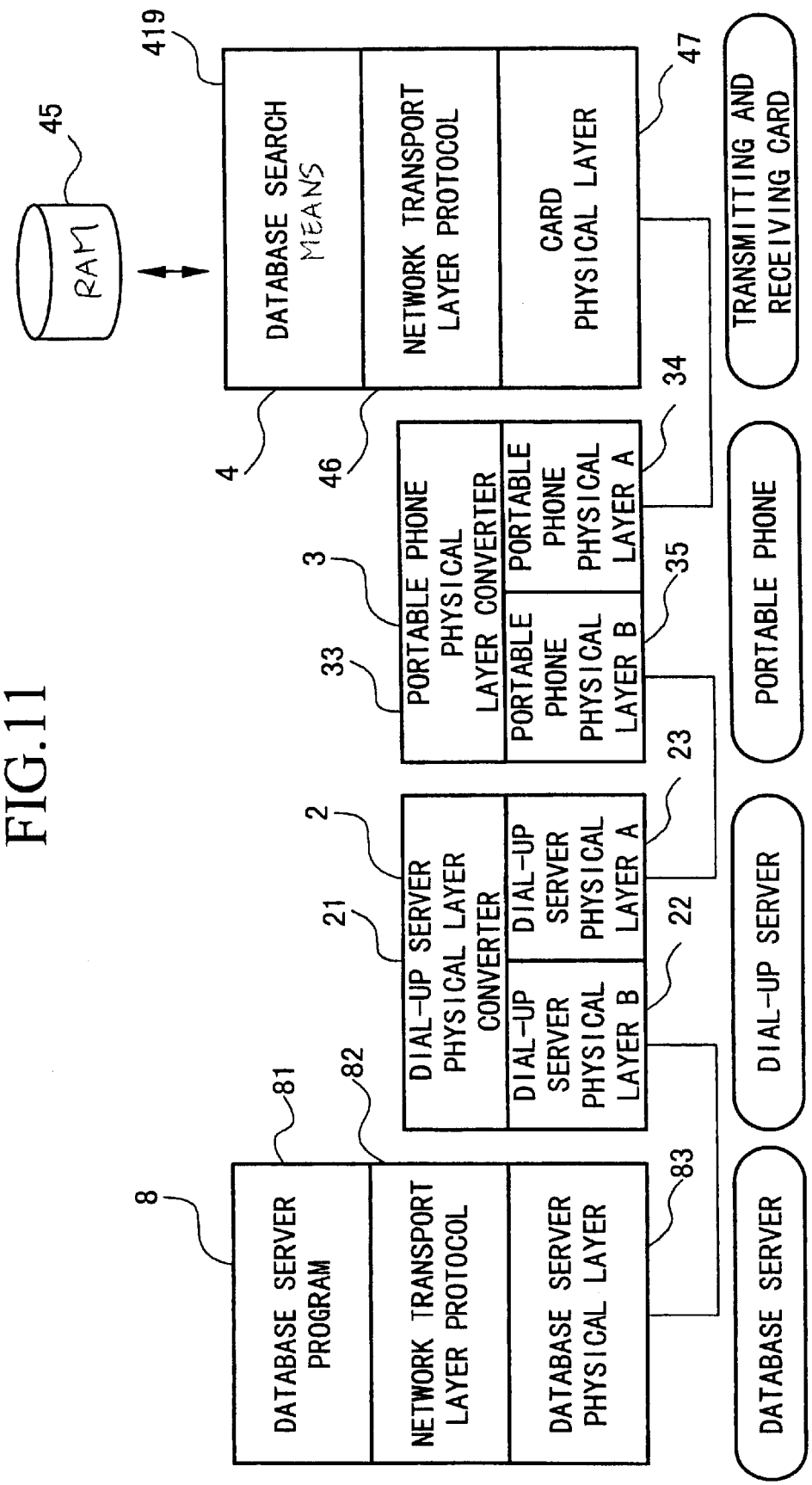
FIG. 11 is a diagram showing the protocol hierarchy when the transmitting and receiving card of FIG. 10 is attached and connected to a portable phone.

In this arrangement, the database search section 419 is operable only when the transmitting and receiving card 4 is attached to the portable phone 3. This section 419 functions as an agent for the user so as to transmit a search request, input by the user, for database server 8 (which has the internal structure as shown in FIG. 11) designated by the user, and continuously waits for a search result from the database server 8. When the database search section 419 receives a search result from the database server 8, the section 419 stores it in RAM 45.

On the other hand, the search result providing section 4110 is operable only when the transmitting and receiving card 4 is attached to a database search terminal 5. If a search result as a response to a request to database server 8 transmitted via interface 43 from database search terminal 5 is stored in RAM 45, the search result providing section 4110 transmits the result, as an agent for the database server 8.

Below, the operations will be explained in detail.

FIG. 11 is a diagram showing the protocol hierarchy when the transmitting and receiving card 4 is attached and connected to the portable phone 3. Here, network transport layer protocol 82 at the database side may be TCP/IP, while database server physical layer 83 may be an Ethernet.

In the above structure, (i) when the user explicitly indicates that data, designated in advance by the user, is retrieved, or (ii) when the radio wave has a good condition and the current time meets the requirement designated by the user, the database search section 419 requests the portable phone 3 to connect to the dial-up server 2. When the connection is completed, the database search section 419 transmits a search command, designated by the user, to database server 8 by using the setting information stored in RAM 45. When the database search section 419 obtains a search result from the database server 8, the section 419 stores the result in RAM 45.

Figure 12:
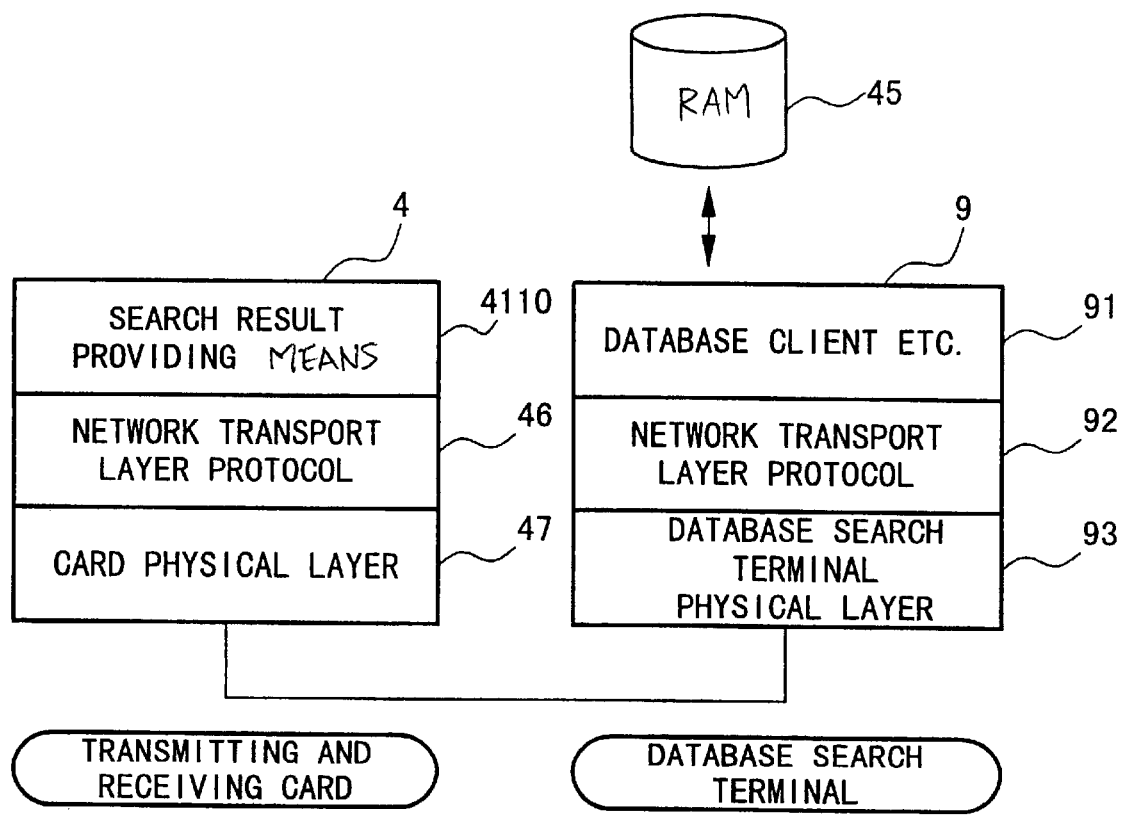
FIG. 12 is a diagram showing the protocol hierarchy when the transmitting and receiving card of FIG. 10 is attached and connected to a database search terminal.

FIG. 12 is a diagram showing the protocol hierarchy when the transmitting and receiving card 4 is attached and connected to database search terminal 9. Here, network transport layer protocol 92 of the database search terminal 9 may be TCP/IP, while database search terminal physical layer 93 may be RS 232C.

In the above structure, when the search result providing section 4110 at the transmitting and receiving card 4 side receives a search request to a database server from database client 91, if data satisfying the request is stored in RAM 45, the section 4110 transmits the data as a response to database client 91.

As explained above, in order to obtain a search result, if the transmitting and receiving card 4 is attached to the portable phone 3, the transmitting and receiving card 4 automatically transmits a search request (desired by the user) and retrieves a search result; thus, it is unnecessary for the user to consider the radio signal quality. This is because when the transmitting and receiving card 4 is attached to the portable phone 3, the database search section 419 of the card monitors the radio signal quality and transmits a search request according to the user's intention and obtains a search result while the condition is good.

When the transmitting and receiving card 4 is attached to the database search terminal 9, the search result in the card can be obtained as if the database search terminal 9 were connected to the portable phone 3. This is because when the transmitting and receiving card 4 is attached to the database search terminal 9, the search result providing section 4110 acts as the database server 8.

What is claimed is:

1. A transmitting and receiving card selectively attached to a portable phone or an e-mail terminal, wherein:
   when the card is attached to the portable phone,
      the card monitors the radio signal quality and acts as an agent for the e-mail terminal so as to receive e-mail addressed to the current user, stored in a mail server, via the portable phone and to transmit e-mail, stored in the card in advance, to the mail server according to a request while the monitored radio signal quality is good, and
   when the card is attached to the e-mail terminal,
      the card functions as a mail server so as to transmit and receive e-mail to and from the e-mail terminal.

2. A transmitting and receiving card selectively attached to a portable phone or an e-mail terminal wherein:
   when the card is attached to the portable phone,
      the card monitors the radio signal quality and acts as an agent for the e-mail terminal so as to receive e-mail addressed to the current user, stored in a mail server, via the portable phone and to transmit e-mail, stored in the card in advance, to the mail server according to a request while the monitored radio signal quality is good, and
   when the card is attached to the e-mail terminal,
      the card functions as a mail server so as to transmit and receive e-mail to and from the e-mail terminal, and wherein,
   the transmitting and receiving card comprises:
      a memory for storing e-mail data and setting information relating to the e-mail data;
      mail receiving means for retrieving the setting information, necessary for receiving the e-mail, stored in the memory, and requesting the mail server to transmit the e-mail address to the user, and for storing e-mail transmitted from the mail server in the memory;
      mail transmitting means for retrieving, if the memory stores e-mail to be transmitted, said e-mail and setting information necessary for transmitting the e-mail, stored in the memory and transmitting the retrieved data to the mail server;
      memory reading reception means for receiving a data retrieval request, from the portable phone or the e-mail terminal to the memory, and information on the target data;
      memory writing reception means for receiving a data storing request, from the portable phone or the e-mail terminal to the memory, and data to be stored, and storing the data in the memory;
      mail receiving reception means for transmitting e-mail stored in the memory to the e-mail terminal when receiving a request from the e-mail terminal for receiving the e-mail from the mail server; and
      mail transmitting reception means for storing e-mail transmitted form the e-mail terminal in the memory when receiving a request from the e-mail terminal for transmitting the e-mail to the e-mail server.

3. A transmitting and receiving card selectively attached to a portable phone or a Web browser terminal, wherein:
   when the card is attached to the portable phone,
      the card monitors the radio signal quality and obtains a Web document having a uniform resource locator format, designated by the current user, from a hyper text transfer protocol server while the monitored radio signal quality is good, and
   when the card is attached to the Web browser terminal,
      the card transmits the obtained Web document to the Web browser terminal so that the user can see the document.

4. A transmitting and receiving card selectively attached to a portable phone or a Web browser terminal, wherein:
   when the card is attached to the portable phone,
      the card obtains a Web document having a uniform resource locator format, designated by the current user, from a hyper text transfer protocol server, and
   when the card is attached to the Web browser terminal,
      the card transmits the obtained Web document to the Web browser terminal so that the user can see the document, and the card comprises:
      hyper text transfer protocol transmitting means for obtaining the Web document having the uniform resource locator format, designated by the user, when the card is attached to the portable phone; and hyper text transfer protocol reception means for obtaining a hyper text transfer protocol request when the card is attached to the Web browser terminal, and transmitting data corresponding to the request to the Web browser terminal.

5. A transmitting and receiving card selectively attached to a portable phone or a database search terminal, wherein:

when the card is attached to the portable phone,
the card monitors the radio signal quality and transmits a search request input by the current user to a database server designated by the user while the monitored radio signal quality is good, and obtains a search result returning from the database server while the monitored radio signal quality is good, and when the card is attached to the database search terminal,
the card acts as the database server so as to transmit a search result to the database search terminal, as a response to a search request transmitted from the database search terminal to the database server.

6. A transmitting and receiving card selectively attached to a portable phone or a database search terminal, wherein:

when the card is attached to the portable phone,
the card transmits a search request input by the current user to a database server designated by the user, and obtains a search result returning from the database server, and when the card is attached to the database search terminal,
the card acts as the database server so as to transmit a search result to the database search terminal, as a response to a search request transmitted from the database search terminal to the database server, and the card comprises:
database search means, operated when the card is attached to the portable phone, for transmitting a search request input by the current user to a database server designated by the user, and obtaining a search result returning from the database server; and search result providing means, acting as the database server when the card is attached to the database search terminal, for transmitting a search result to the database search terminal, as a response to a search request transmitted from the database search terminal to the database server.

* * * * *